United States Patent
Chen (10) Patent No.: US 7,303,171 B1
(45) Date of Patent: Dec. 4, 2007

(54) ADJUSTABLE FIXING MOUNT

(75) Inventor: Jeong-Shiun Chen, Taipei Hsien (TW)

(73) Assignee: Supa Technology Co., Ltd., Zhonghe, Taipei Hsien (TW)

( * ) Notice: Subject to any disclaimer, the term of this patent is extended or adjusted under 35 U.S.C. 154(b) by 0 days.

(21) Appl. No.: 11/562,106

(22) Filed: Nov. 21, 2006

(51) Int. Cl.
*F16M 11/14* (2006.01)

(52) U.S. Cl. .............................. 248/184.1; 248/206.2; 248/208; 224/908; 396/419

(58) Field of Classification Search ............... 248/674, 248/178.1, 184.1, 187.1, 278.1, 205.5, 206.2, 248/208, 467, 484–487, 122.1; 396/419, 396/420, 427, 428; 224/901.2, 902, 908, 224/401, 408, 559; 352/243, 132
See application file for complete search history.

(56) References Cited

U.S. PATENT DOCUMENTS

| | | | | |
|---|---|---|---|---|
| 3,833,196 A | * | 9/1974 | Protzman | .................... 248/208 |
| 4,085,915 A | * | 4/1978 | Song et al. | ............... 248/187.1 |
| 4,979,709 A | * | 12/1990 | Ishikawa | .................. 248/187.1 |
| 5,246,193 A | * | 9/1993 | Faidley | ..................... 248/206.3 |
| 5,835,808 A | * | 11/1998 | Parker et al. | ............... 396/419 |
| 5,938,155 A | * | 8/1999 | Garland | ..................... 248/187.1 |
| 6,234,690 B1 | * | 5/2001 | Lemieux | ..................... 396/419 |
| 6,268,556 B1 | * | 7/2001 | Liao | ............................ 84/421 |
| 2005/0265711 A1 | * | 12/2005 | Heibel | ........................ 396/419 |

* cited by examiner

*Primary Examiner*—Korie H. Chan
(74) *Attorney, Agent, or Firm*—WPAT, P.C.; Anthony King (57) ABSTRACT

An adjustable fixing mount for communication equipment comprises a seat, a horizontal rotary device, a pitch-adjusting device and a swing-adjusting device. The horizontal rotary device is mounted on the seat and is capable of rotating freely to adjust the horizontal angle. The pitch-adjusting device is disposed on the horizontal rotary device and is capable of rotating freely to adjust the pitch angle. The swing-adjusting device is disposed on the pitch-adjusting device and is capable of rotating freely to adjust the swing angle. The upper part of the swing-adjusting device includes an equipment seat to hold the communication equipment. The adjustable fixing mount could adjust the communication equipment toward an appropriate direction and angle.

4 Claims, 15 Drawing Sheets

ADJUSTABLE FIXING MOUNT

BACKGROUND OF THE INVENTION

1. Field of the Invention

The present invention relates generally to a fixing mount, and in particular to an adjustable fixing mount for the communication equipments that is capable of sucking on a plane surface and adjust the horizontal angle and pitch angle. Thus, the communication equipment is directed toward the most appropriate direction and angle.

2. The Prior Arts

Nowadays all kinds of communication equipments such as mobile phones, PDA's, GPS's, etc provide convenient communication. Users may get in touch with others anywhere and anytime. However, how to place these communication equipments becomes a problem when the users drive or ride a vehicle.

Although conventional fixing mounts for communication equipments provide to hold all kinds of communication equipments in a vehicle, it has some shortcomings in common. The conventional fixing mount is a rigid body so that the user cannot adjust the height, angle or direction. Therefore, the fixing mount is inconvenient to operate because it is against the ergonomics and the user's habit. It cannot work well as a tool for the communication equipment.

SUMMARY OF THE INVENTION

An adjustable fixing mount according to the present invention is provided to solve the drawback of the conventional fixing mount that cannot freely adjust the horizontal angle and the pitch angle to fit the ergonomic principle and human habit.

The fixing mount according to the present invention comprises a seat, a horizontal rotary device, a pitch-adjusting device and a swing-adjusting device. The upper side of the seat is formed with an annular gear section including a plurality of cogs and the lower side of the seat is formed with a sucking disc. The horizontal rotary device comprises a hollow and annular integration seat in which elastic pieces are set to engage with the gear section of the seat. A bolt is screw-locked into the middle of the gear section through the integration seat, thereby connecting the horizontal rotary device and the seat. Thus, the horizontal rotary device could rotate freely to adjust the horizontal angle. The top of integration seat of the horizontal rotary device includes a pitch-adjusting groove. The pitch-adjusting device comprises a pitch-adjusting seat. A plurality of positioning fixation holes is annularly arranged around the cylindrical pitch-adjusting seat. The pitch-adjusting seat is inserted into and connected with the corresponding pitch-adjusting groove of the horizontal rotary device. Thus the pitch-adjusting device is capable of rotating to adjust the pitch angle freely. The upper side of the pitch-adjusting seat is formed with a swing-adjusting groove. The swing-adjusting device comprises a swing-adjusting seat, which cooperates with the swing-adjusting groove to make the swing-adjusting seat rotate thereby adjusting the swing angle freely. The upper side of the swing-adjusting seat is formed with an equipment seat, which holds communication equipment.

A primary objective of the present invention is to provide an adjustable fixing mount so that the mobile phone, PDA or GPS, etc. could be placed in an equipment seat of the swing-adjusting device. A horizontal rotary device, a pitch-adjusting device and a swing-adjusting device are rotated to adjust the horizontal angle, the pitch angle and the swing angle, respectively, so that the communication equipment could be placed at a proper height and angle.

Another objective of the present invention is to provide an adjustable fixing mount with a sucking disc on the seat to be attached to and fixed on a surface of an object. Such design is convenient to attach to and remove from a plane surface everywhere, anytime.

A further objective of the present invention is to provide an adjustable fixing mount with simple structure and easy to use. Thus it could replace all kinds of conventional fixing mounts for economical efficiency.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
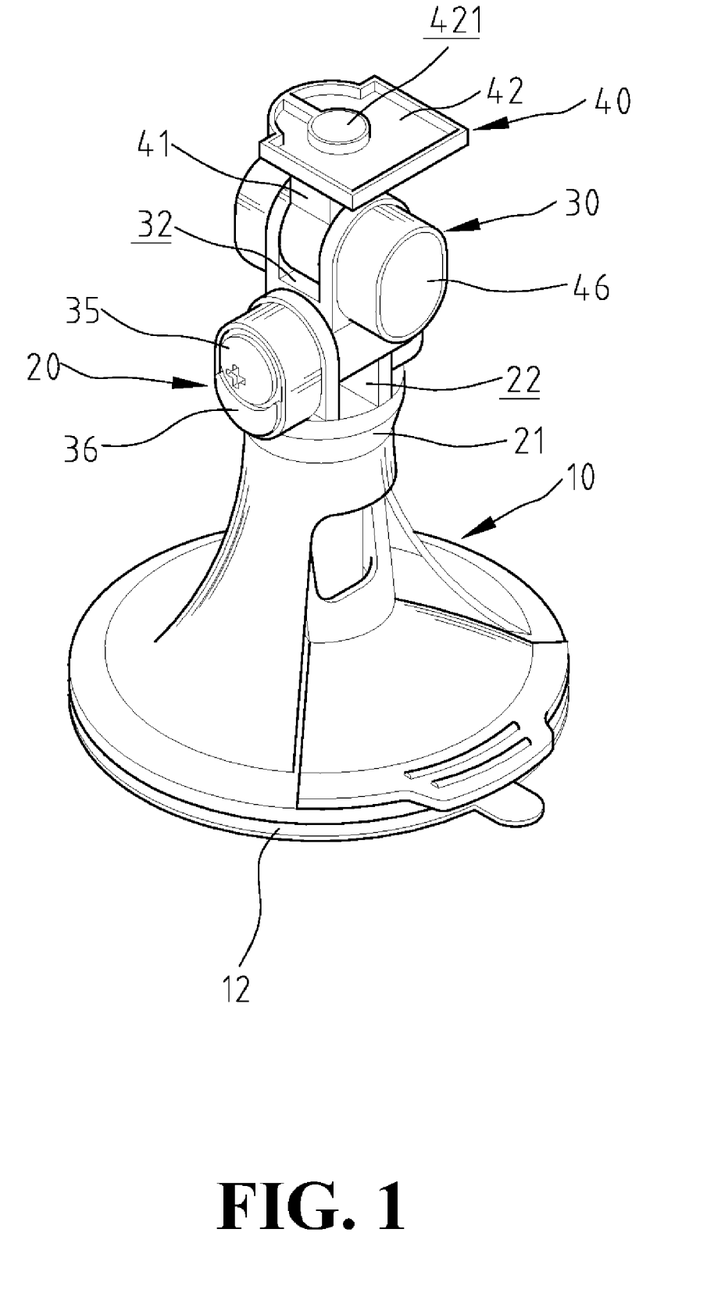
FIG. 1 is an assembly view showing a fixation device in accordance with the present invention.
Figure 2:
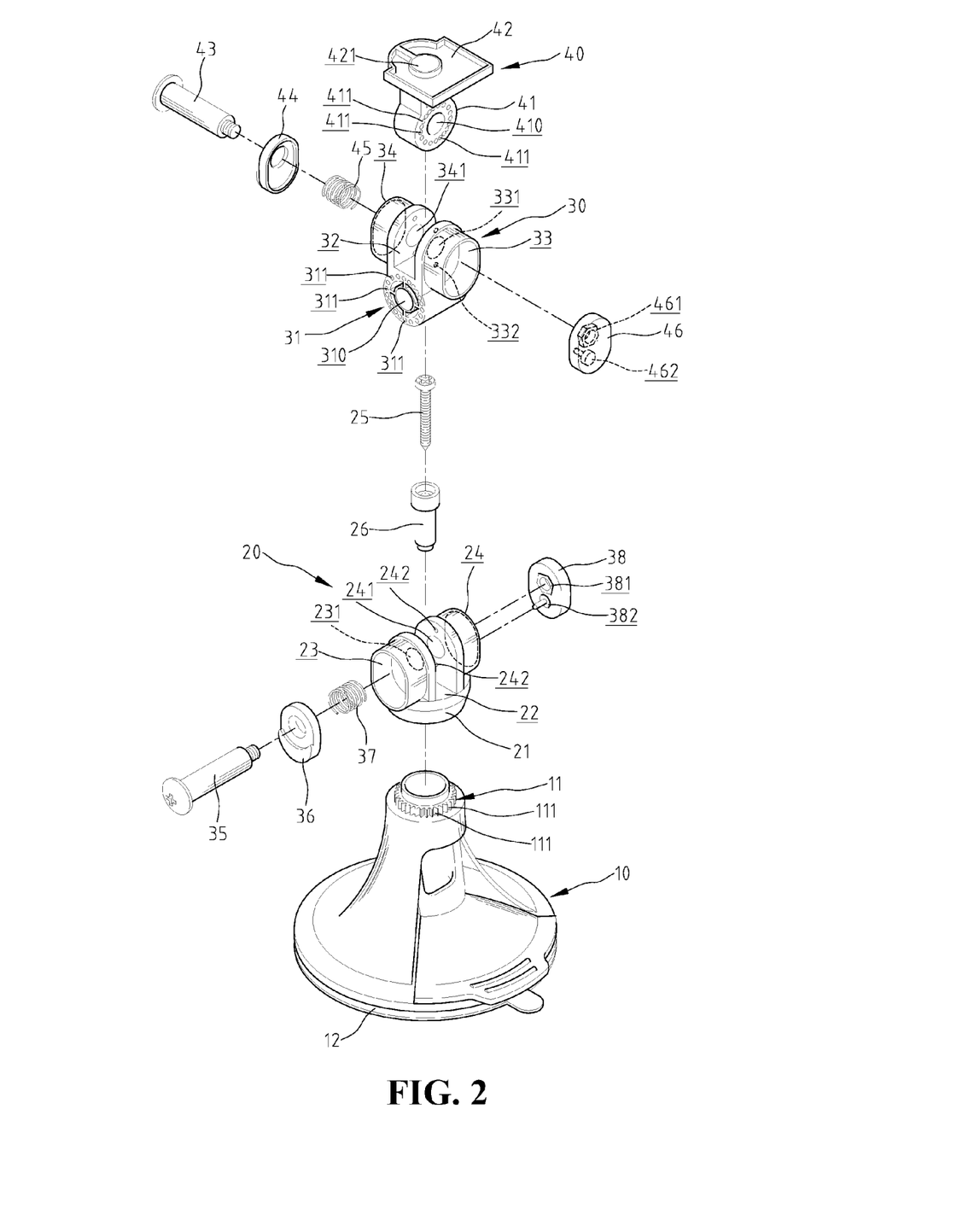
FIG. 2 is an exploded view of the fixation device in accordance with the present invention.

With reference to the FIGS. 1 and 2, the adjustable fixing mount constructed in accordance with the present invention comprises a seat 10, a horizontal rotary device 20, a pitch-adjusting device 30 and a swing-adjusting device 40.

The top of the seat 10 is provided with a horizontal annular gear section 11. The gear section 11 has a plurality of cogs at an outer rim. The bottom of the seat 10 is provided with a sucking disc 12 made of a tenacious material to attach to a plane surface of an object.

Figure 7:
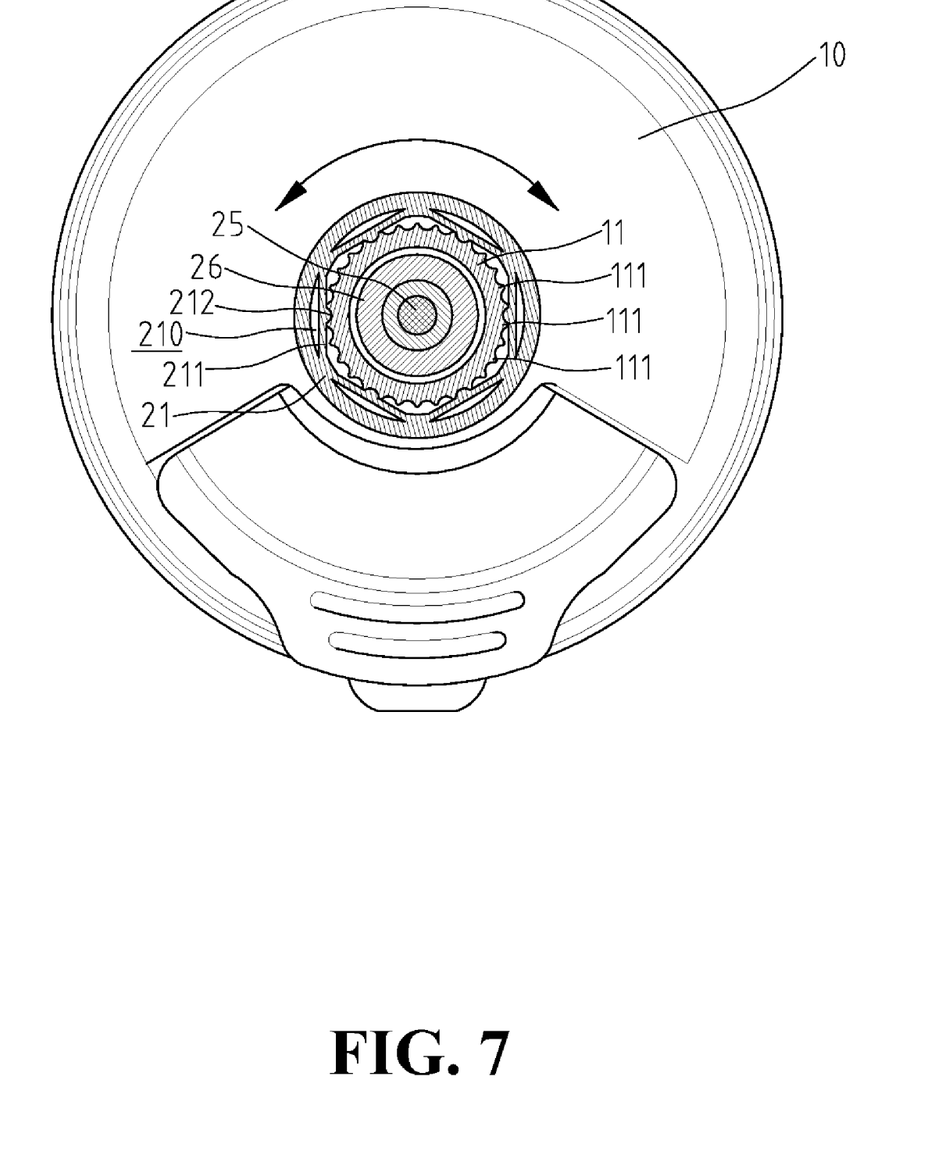
FIG. 7 is a top cross-sectional view showing the horizontal rotary device integrated with the seat.

The horizontal rotary device 20 comprises a hollow annular integration seat 21 whose inner rim includes a plurality of elastic pieces 211. Referring to FIG. 7, both ends of the elastic piece 211 are fixed at the inner rim of the integration seat 21, and an arc hollow gap 210 is formed between the integration seat 21 and the elastic piece 211. The elastic piece 211 has at least one projection 212 at the side towards the axial direction of the adjustable fixing mount. The projection 212 meshes with the cogs 111 of the gear section 11 on the seat 10. Both sides of the top of the integration seat 21 of the horizontal rotary device 20 are provided with a first caved pitch lug 23 and a second caved pitch lug 24, respectively. A pitch-adjusting groove 22 is disposed between the first caved pitch lug 23 and the second caved pitch lug 24. The first caved pitch lug 23 and the second caved pitch lug 24 have a first pitch lughole 231 and a second pitch lughole 241, respectively. At least one first positioning through hole 242 is disposed by the second pitch lughole 241. Referring to FIGS. 2, 3, 4 and 5, a connecting screw 25 passes through a hollow joint element 26 and the integration seat 21 of the horizontal rotary device 20 to screw-lock into the gear section 11 of the seat 10 so that the horizontal rotary device 20 connects with the seat 10.

Figure 4:
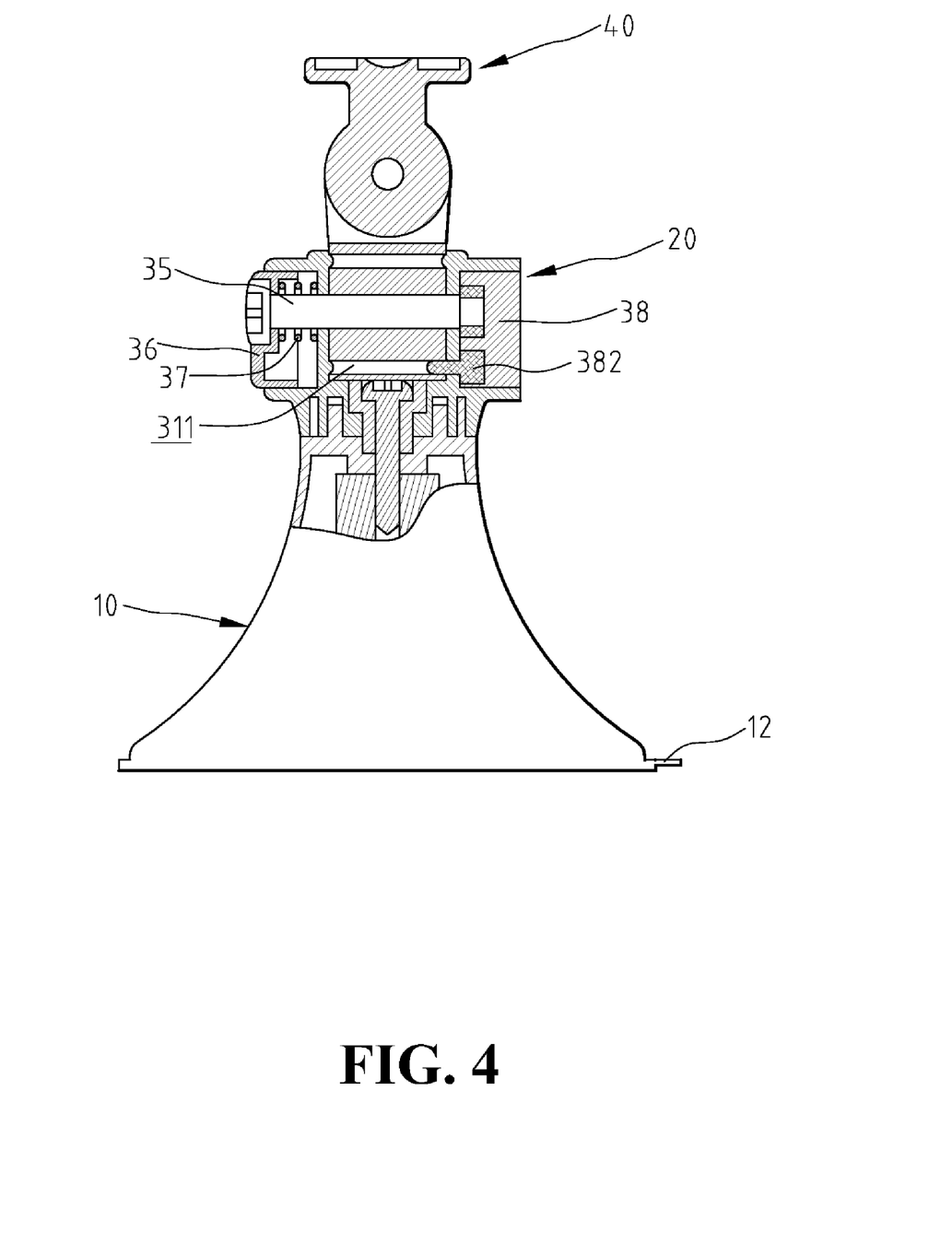
FIG. 4 is a side cross-sectional view showing the fixation device in accordance with the present invention.
Figure 5:
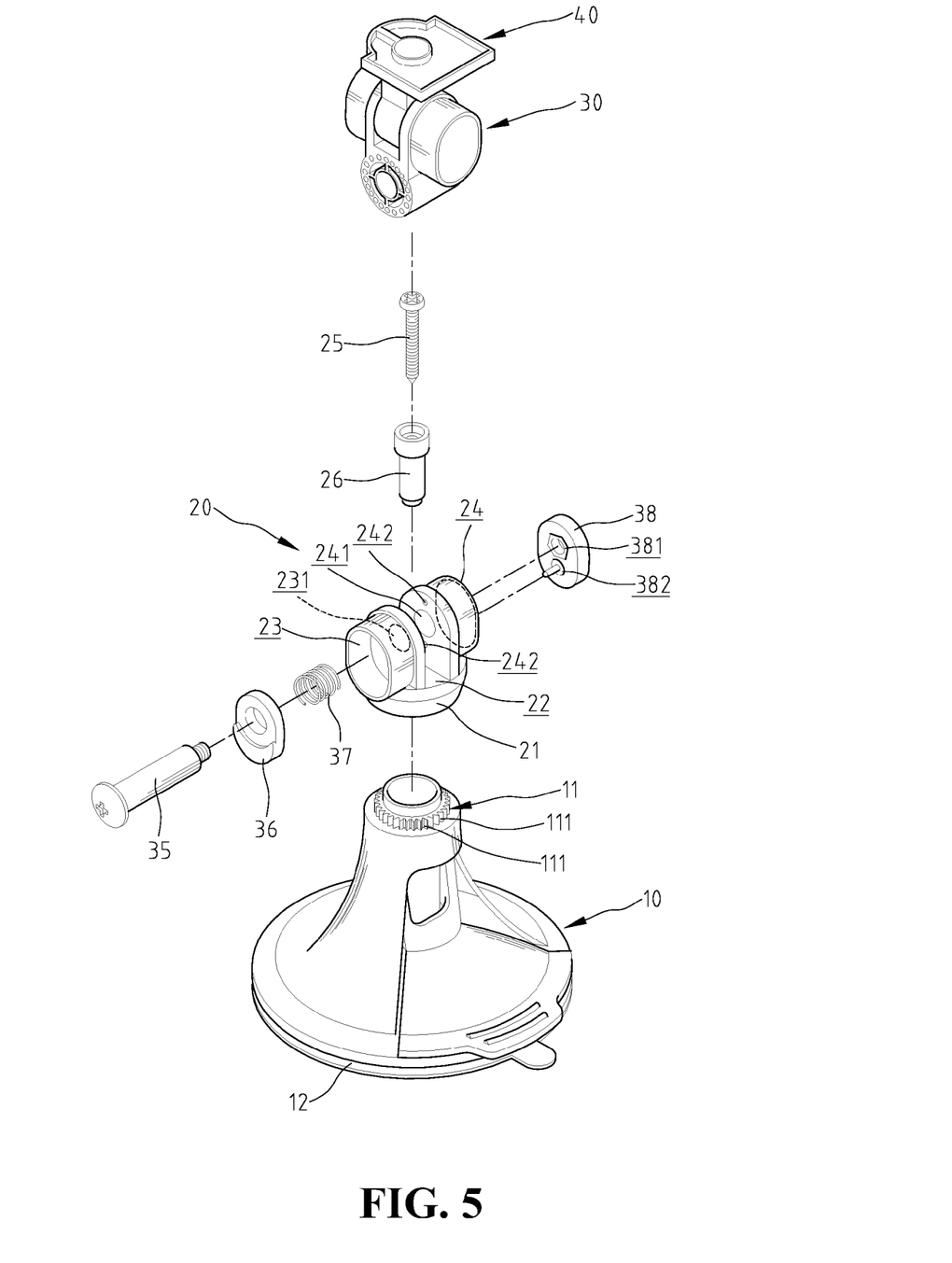
FIG. 5 is an exploded view showing a horizontal rotary device of the adjustable fixing mount according to the present invention.
Figure 8:
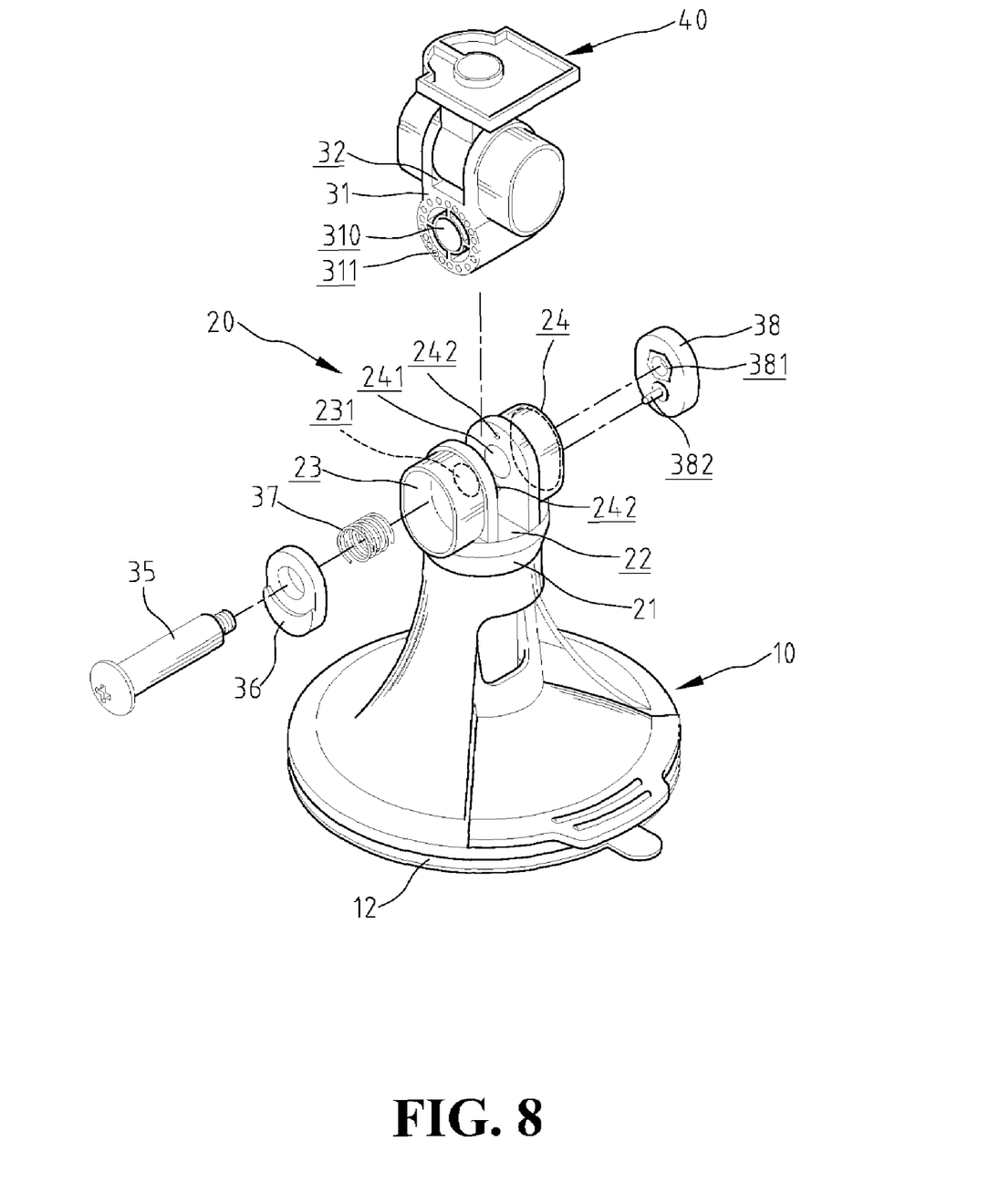
FIG. 8 is an exploded schematic view showing a pitch-adjusting device connecting with the horizontal rotary device.
Figure 10A:
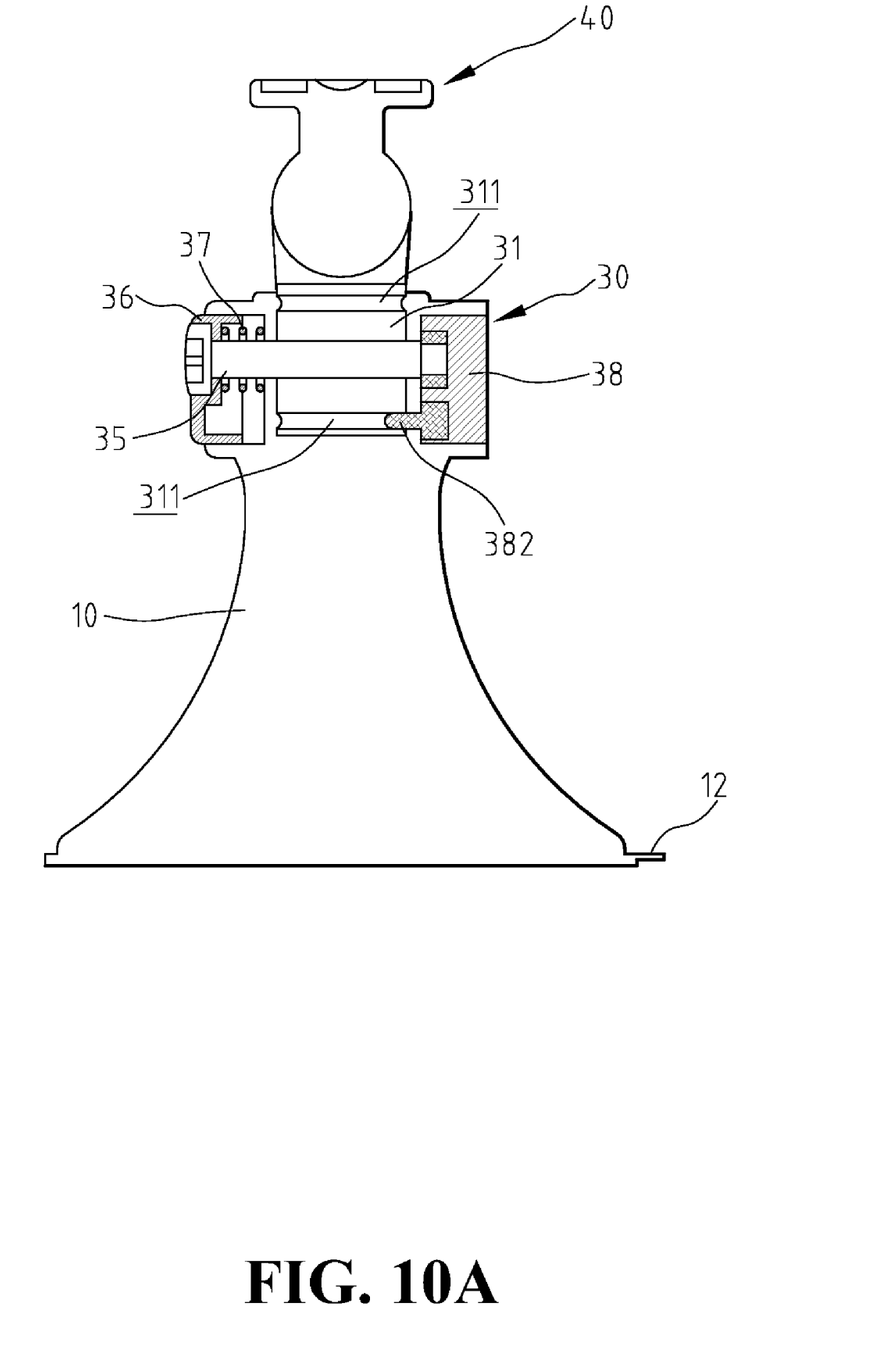
FIG. 10A is an assembled cross-sectional view showing the pitch-adjusting device of the present invention in a stationary state.

Referring to FIG. 2, the pitch-adjusting device 30 comprises a hollow cylindrical pitch-adjusting seat 31 having a first integrating hole 310 at the center. A plurality of first positioning fixation holes 311 is annularly arranged around the cylindrical pitch-adjusting seat 31. Both sides of the top of the pitch-adjusting seat 31 are provided with a first caved swing lug 33 and a second caved swing lug 34, respectively. A swing-adjusting groove 32 is disposed between the first caved swing lug 33 and the second caved swing lug 34. The first caved swing lug 33 and the second caved swing lug 34 have a first swing lughole 331 and a second swing lughole 341, respectively. At least one second positioning through hole 332 is disposed by the first swing lughole 331. Referring to FIG. 8, a bolt 35 passes through a through hole of a first pressing element 36, a first elastic unit 37, the first pitch lughole 231 of the first caved pitch lug 23, the first integrating hole 310 of the pitch-adjusting seat 31, the second pitch lughole 241 of the second caved pitch lug 24, to lock into a first assembling hole 381 of a first positioning unit 38. Thus the pitch-adjusting device 30 and the horizontal rotary device 20 are assembled together. As shown in FIGS. 2 and 4, a protruding first positioning pole 382 is disposed by the first assembling hole 381 of the first positioning unit 38 and passes through the first positioning through hole 242 at the second caved pitch lug 24. In addition, the first pressing element 36 clamps and fixes the first elastic unit 37 into the first caved pitch lug 23. The compressed first elastic unit 37 pushes the first pressing element 36 and the bolt 35 outward (left) and pulls the first positioning unit 38 inward (left). Thus the first positioning pole 382 is inserted into one of the annularly arranged first positioning fixation holes 311 at the side of the pitch-adjusting seat 31, thereby fixing the pitch-adjusting seat 31 in a stationary state (as shown in FIG. 10A). The first elastic unit 37 is a coil spring in this embodiment.

Figure 3:
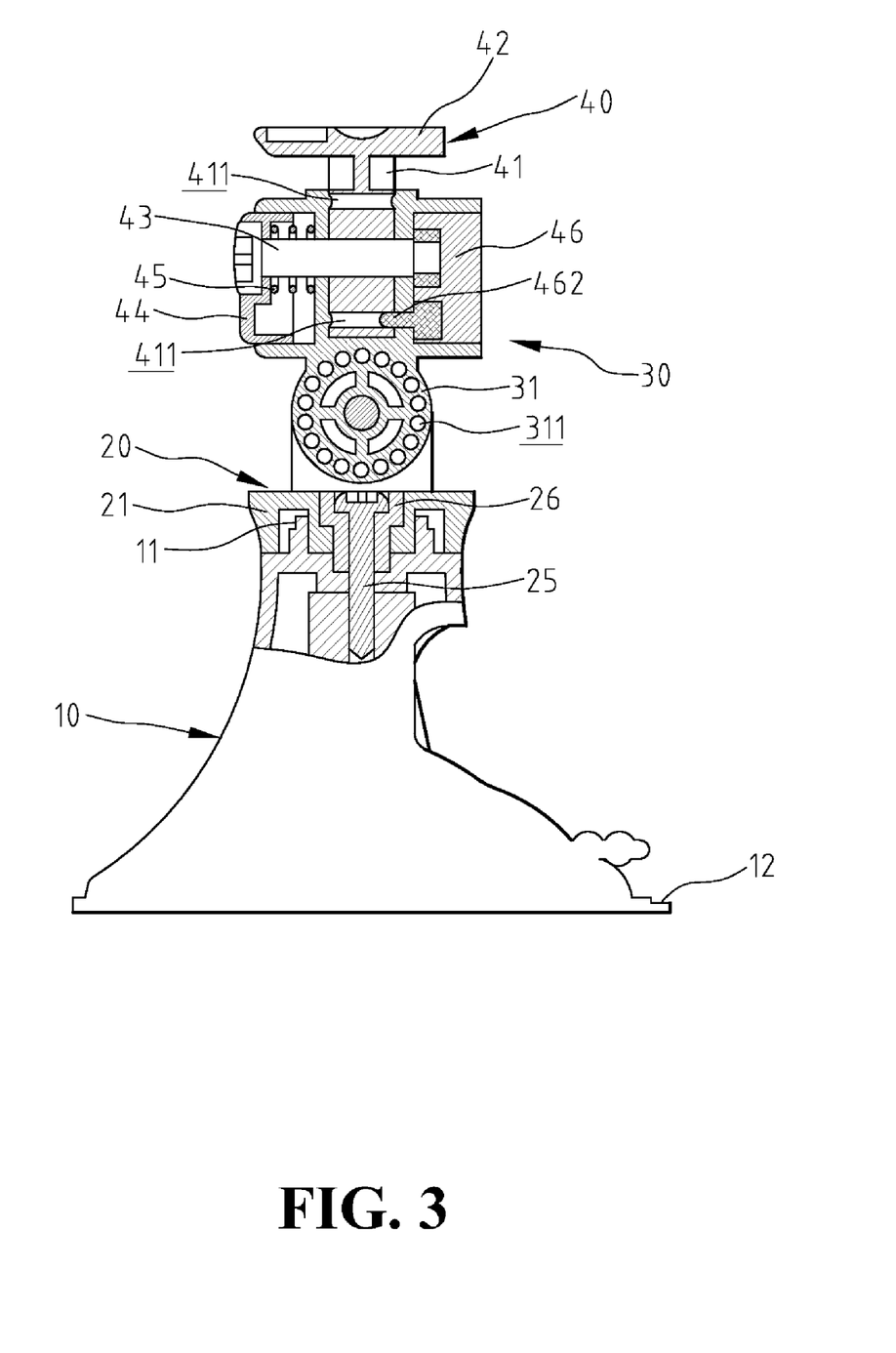
FIG. 3 is a front cross-sectional view showing the fixation device in accordance with the present invention.
Figure 11:
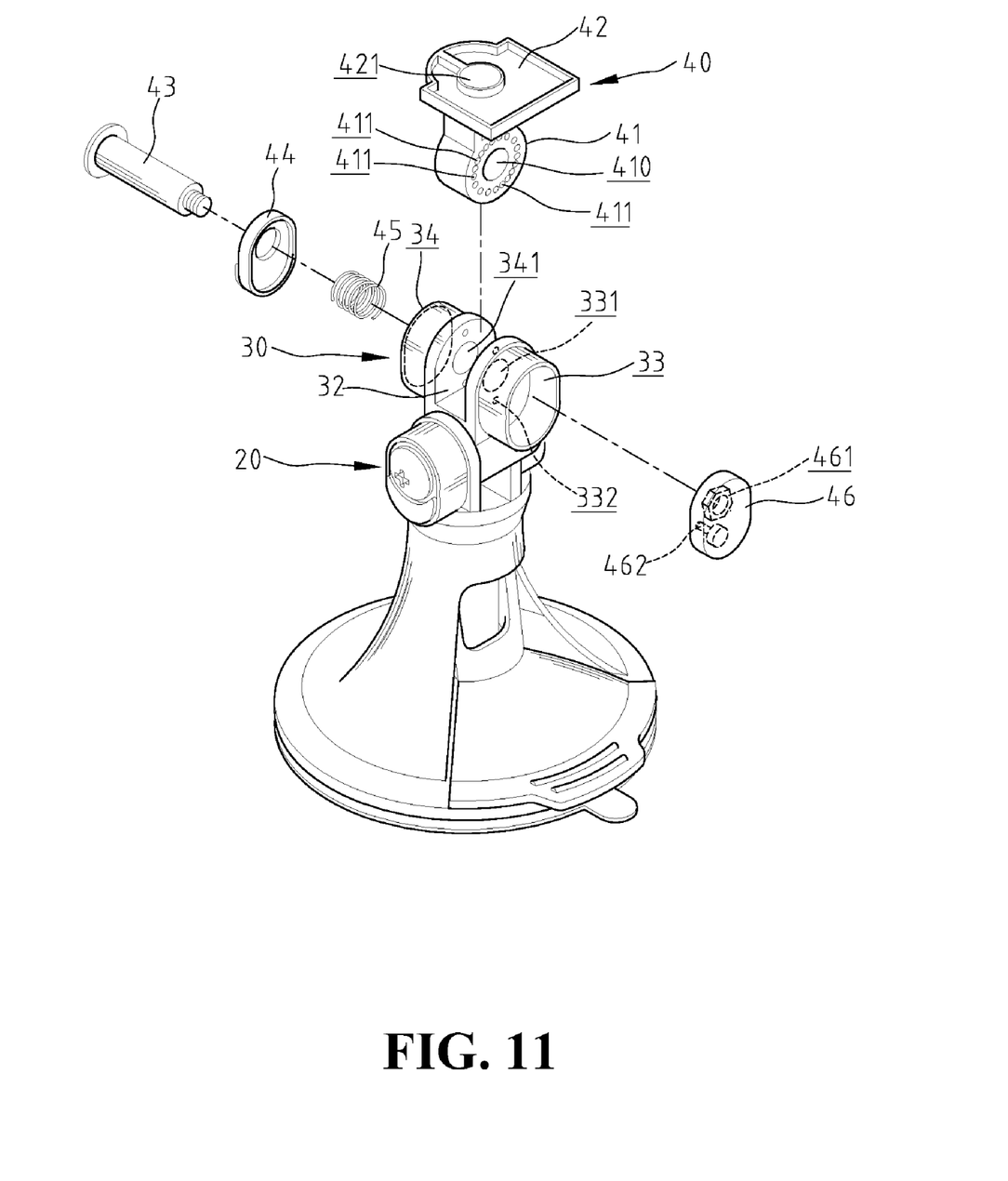
FIG. 11 is an exploded schematic view showing a swing-adjusting device connecting with the pitch-adjusting device.
Figure 13A:
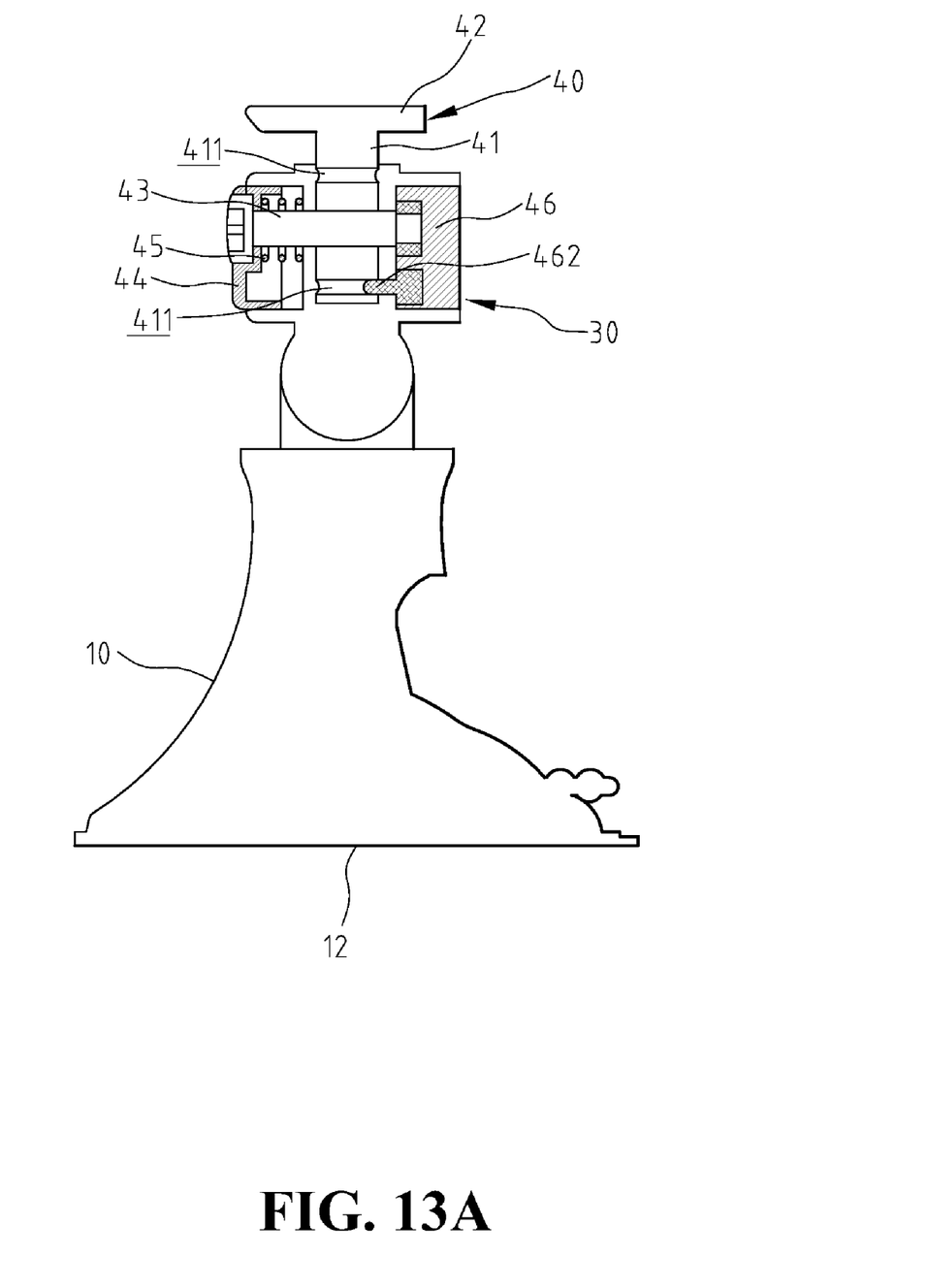
FIG. 13A is an assembled cross-sectional view showing the swing-adjusting device of the present invention in a stationary state.

The swing-adjusting device 40 comprises a hollow cylindrical swing-adjusting seat 41 having a second integrating hole 410 at the center. A plurality of second positioning fixation holes 411 is annularly arranged around the cylindrical swing-adjusting seat 41. The top of the swing-adjusting seat 41 comprises an equipment seat 42, which is a platform and has an equipment assembly hole 421. Referring to FIG. 11, a fastening pin 43 passes through a through hole of a second pressing element 44, a second elastic unit 45, the second swing lughole 341 of the second caved swing lug 34, the second integrating hole 410 of the swing-adjusting seat 41, the first swing lughole 331 of the first caved swing lug 33, to lock into a second assembling hole 461 of a second positioning unit 46. Thus the swing-adjusting device 40 and the pitch-adjusting device 30 are assembled together. Referring to FIGS. 2 and 3, a protruding second positioning pole 462 is disposed by the second assembling hole 461 of the second positioning unit 46 and passes through the second positioning through hole 332 at the first caved swing lug 33. In addition, the second pressing element 44 clamps and fixes the second elastic unit 45 into the second caved swing lug 34. The compressed second elastic unit 45 pushes the second pressing element 44 and the fastening pin 43 outward (left), and pulls the second positioning unit 46 inward (left). Thus the second positioning pole 462 of the second positioning unit 46 is inserted into one of the annularly arranged second positioning fixation holes 411 at the side of the swing-adjusting seat 41, thereby fixing the swing-adjusting seat 41 (as shown in FIG. 13A) in a stationary state. The second elastic unit 45 is a coil spring in this embodiment.

The present invention provides the sucking disc 12 at the bottom of the seat 10 to attach to the plane surface of an object. Thus the fixing mount according to the present invention is fixed at the surface of the object to use. The sucking disc 12 is disengaged from the surface of the object when the fixing mount is not in use.

Figure 6:
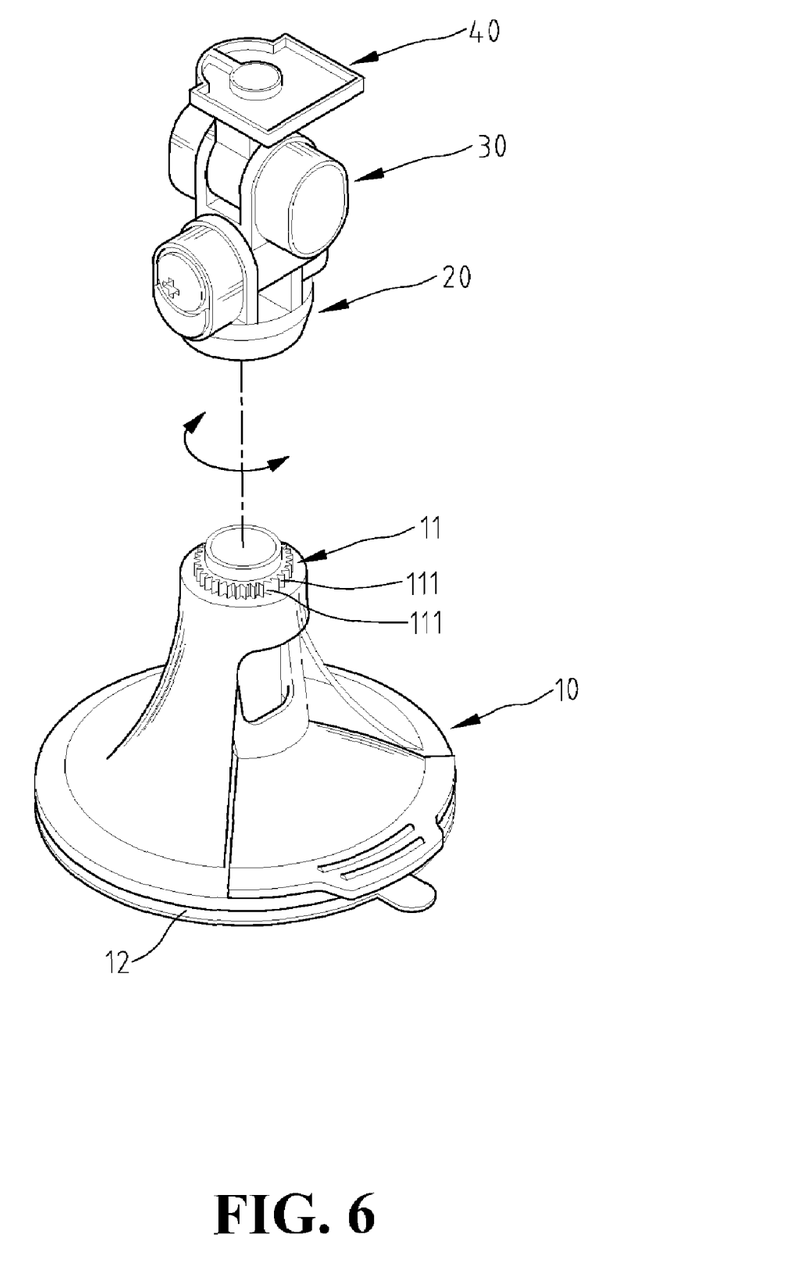
FIG. 6 is a schematic view showing the rotation of the horizontal rotary device relative to a seat.

The horizontal rotary device 20 according to the present invention is used to adjust the horizontal angle. Referring to FIGS. 6 and 7, when the horizontal rotary device 20 is rotated, the cogs 111 of the gear section 11 push the projections 212 of the elastic pieces 211 towards the hollow gap 210. When the projection 212 is rotated to a place between two cogs 111, the deformed elastic piece 211 returns to its original state and the projection 212 engages with two cogs 111. The elastic pieces 211, the projections 212 and the cogs 111 of the gear section 11 interact each other to reach an appropriate horizontal angle.

Figure 9:
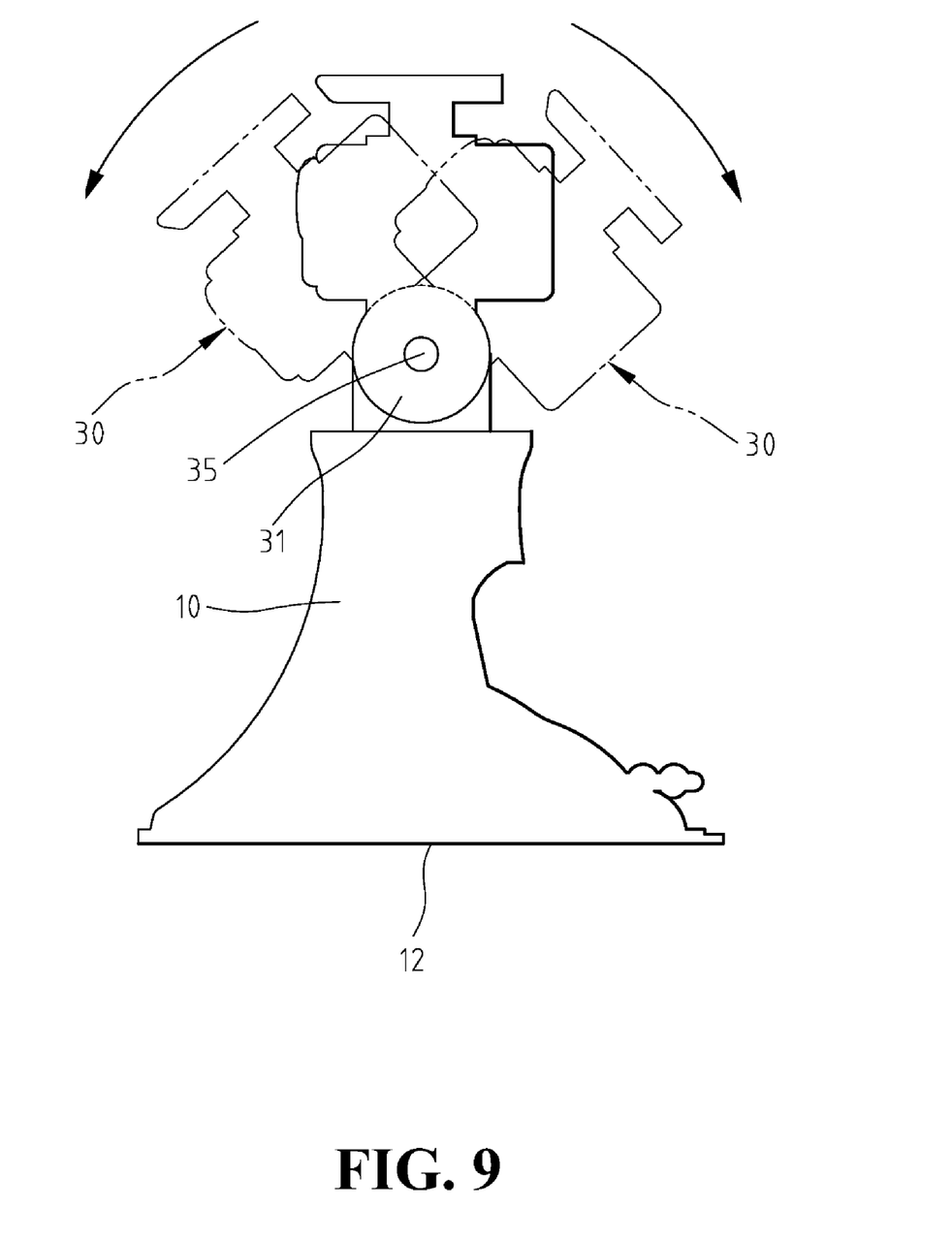
FIG. 9 is a schematic view showing the rotation of the pitch-adjusting device of the fixing mount constructed in accordance with the present invention.
Figure 10B:
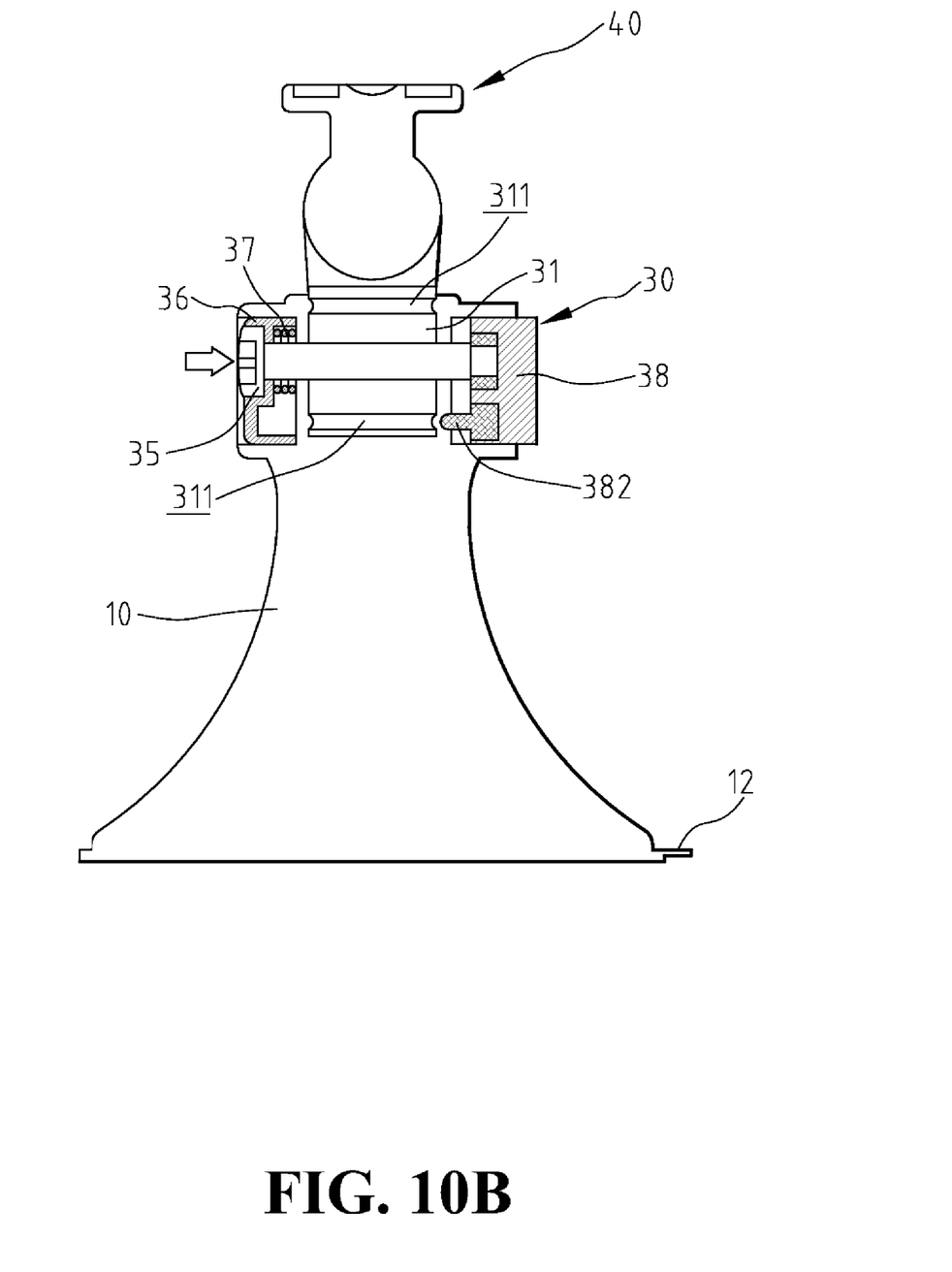
FIG. 10B is an assembled cross-sectional view showing the pitch-adjusting device of the present invention in a rotary state.

The pitch-adjusting device 30 of the present invention is used to adjust the pitch angle. Referring to FIGS. 9, 10A and 10B, when the pitch-adjusting device 30 is in a stationary state, the first positioning pole 382 is inserted into the first positioning fixation hole 311 at the side of the pitch-adjusting seat 31. When the first pressing element 36 is pressed inward, the bolt 35 pushes the first positioning unit 38 outward and the first positioning pole 382 moves out of the first positioning fixation hole 311. The pitch-adjusting seat 31 is then free to rotate around the bolt 35 to adjust the pitch angle of the pitch-adjusting device 30. When an appropriate angle is reached, release the first pressing element 36. The first elastic unit 37 returns to its original state and pushes the first pressing element 36 outward. Then the bolt 35 pulls the first positioning unit 38 inward and the first positioning pole 382 is inserted into one of the first positioning fixation hole 311 at the side of the pitch-adjusting seat 31. Therefore, the pitch-adjusting device 30 is fixed at a stationary state and an appropriate pitch angle.

Figure 12:
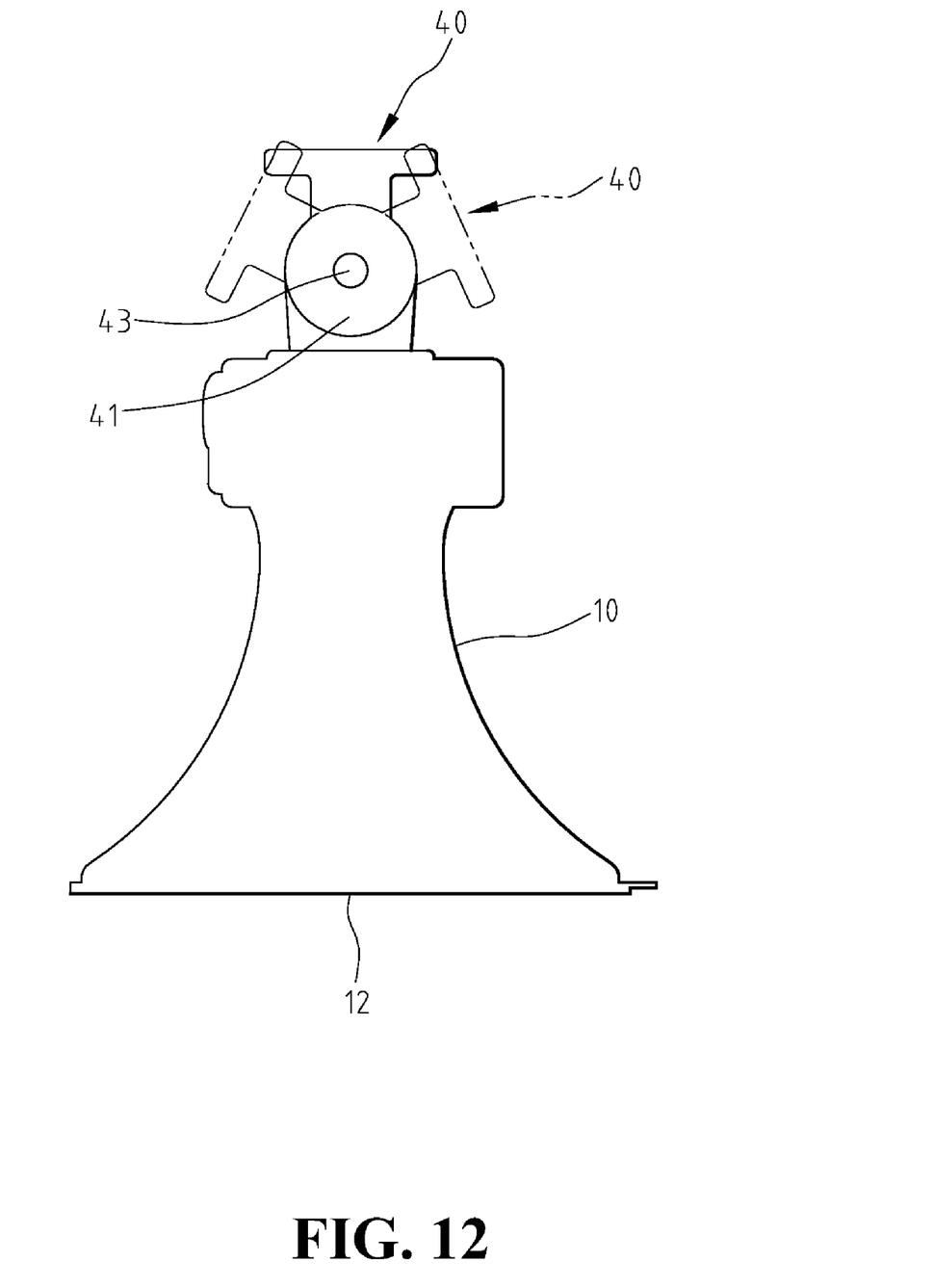
FIG. 12 is a schematic view showing the rotation of the swing-adjusting device of the fixing mount constructed in accordance with the present invention.
Figure 13B:
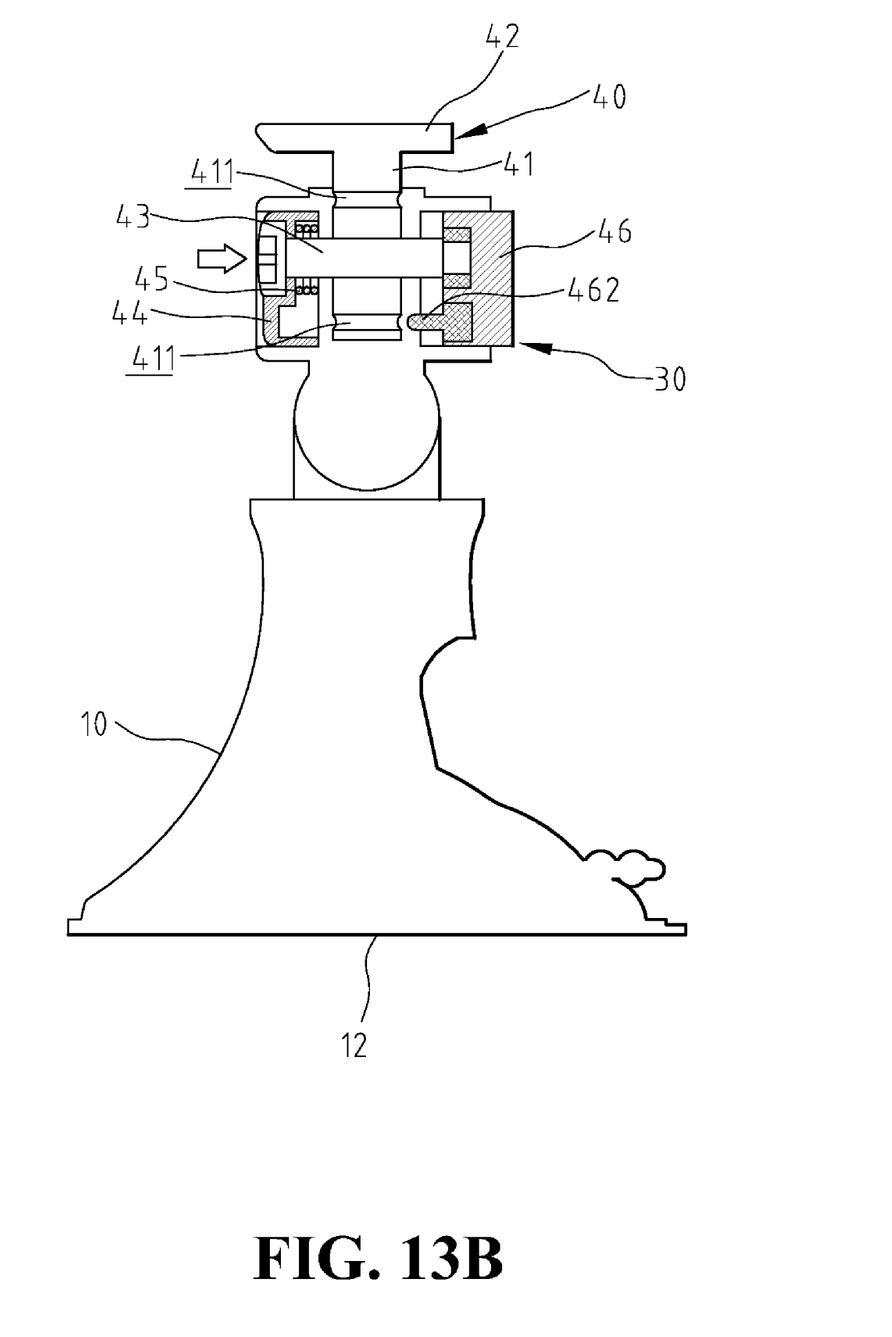
FIG. 13B is an assembled cross-sectional view showing the swing-adjusting device of the present invention in a rotary state.

The swing-adjusting device 40 of the present invention can adjust the swing angle freely, whose rotating axis is orthogonal to the rotating axis of the pitch-adjusting device 30. Referring to FIGS. 12, 13A and 13B, when the swing-adjusting device 40 is in a stationary state, the second positioning pole 462 is inserted into the second positioning fixation hole 411 at the side of the swing-adjusting seat 41.

When the second pressing element 44 is pressed inward, the fastening pin 43 pushes the second positioning unit 46 outward. The second positioning pole 462 on the second positioning unit 46 moves out of the second positioning fixation hole 411. The swing-adjusting seat 41 is then free to rotate around the fastening pin 43 to adjust the swing angle of the swing-adjusting device 40. When an appropriate angle is reached, release the second pressing element 44. The compressed second elastic unit 45 returns to its original state and pushes the second pressing element 44 outward. Then the fastening pin 43 pulls the second positioning unit 46 inward and the second positioning pole 462 is inserted into one of the second positioning fixation hole 411 at the side of the swing-adjusting seat 41. Therefore, the swing-adjusting device 40 is fixed at a stationary state and an appropriate swing angle.

A communication equipment such as mobile phone, PDA, GPS, etc is mounted on the platform of the equipment seat 42 of the swing-adjusting device 40 and locked into the equipment assembly hole 421 of the equipment seat 42.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An adjustable fixing mount, comprising
a seat including an annular gear section at a top thereof and a sucking disc at a bottom thereof; wherein a plurality of cogs are arranged at an outer rim of the gear section, and the sucking disc is capable of sucking on a surface of an plane object;
a horizontal rotary device comprising a hollow annular integration seat, whose inner rim having a plurality of elastic pieces, a first caved pitch lug and a second caved pitch lug at both sides of a top of the integration seat, and a pitch-adjusting groove between the first caved pitch lug and the second caved pitch lug; wherein both ends of the elastic piece are fixed at the inner rim of the integration seat; a hollow gap is formed between the elastic piece and the integration seat; the elastic piece has at least one projection at the side towards an axial direction of the adjustable fixing mount; the projections mesh with the cogs of the gear section; the first caved pitch lug and the second caved pitch lug have a first pitch lughole and a second pitch lughole, respectively; at least one first positioning through hole is disposed by the second pitch lughole; a connecting screw screws the integration seat to the gear section, thereby connecting the horizontal rotary device with the seat;
a pitch-adjusting device comprising a hollow cylindrical pitch-adjusting seat formed with a first integrating hole, a first caved swing lug and a second caved swing lug at both sides of a top of the pitch-adjusting seat, and a swing-adjusting groove between the first caved swing lug and the second caved swing lug; wherein a plurality of first positioning fixation holes is annularly arranged around the cylindrical pitch-adjusting seat; the first caved swing lug and the second caved swing lug have a first swing lughole and a second swing lughole, respectively; at least one second positioning through hole is disposed by the first swing lughole; a bolt passes through a first pressing element, a first elastic unit, the first pitch lughole, the first integrating hole, the second pitch lughole, to lock into a first assembling hole of a first positioning unit, thereby connecting the pitch-adjusting device with the horizontal rotary device; a protruding first positioning pole is disposed by the first assembling hole of the first positioning unit and passes through the first positioning through hole at the second caved pitch lug; the first pressing element clamps and fixes the first elastic unit into the first caved pitch lug; the compressed first elastic unit pushes the first pressing element and the bolt outward and pulls the first positioning unit inward; the first positioning pole of the first positioning unit is inserted into one of the first positioning fixation holes at the side of the pitch-adjusting seat, thereby fixing the pitch-adjusting seat in a stationary state; and
a swing-adjusting device comprising a hollow cylindrical swing-adjusting seat formed with a second integrating hole at the center, and an equipment seat, which is disposed at a top of the swing-adjusting seat and has an equipment assembly hole; wherein a plurality of second positioning fixation holes is annularly arranged around the cylindrical swing-adjusting seat; a fastening pin passes through a second pressing element, a second elastic unit, the second swing lughole, the second integrating hole of the swing-adjusting seat, the first swing lughole, to lock into a second assembling hole of a second positioning unit, thereby connecting the swing-adjusting device with the pitch-adjusting device; a protruding second positioning pole is disposed on the second positioning unit and passes through the second positioning through hole at the first caved swing lug; the second pressing element clamps and fixes the second elastic unit into the second caved swing lug; the compressed second elastic unit pushes the second pressing element and the fastening pin outward, and pulls the second positioning unit inward; the second positioning pole of the second positioning unit is inserted into one of the second positioning fixation holes at the side of the swing-adjusting seat, thereby fixing the swing-adjusting seat in a stationary state.

2. The mount as claimed in claim 1, wherein the sucking disc is made of a tenacious material.

3. The mount as claimed in claim 1, wherein the first elastic unit of the pitch-adjusting device is a coil spring.

4. The mount as claimed in claim 1, wherein the second elastic unit of the swing-adjusting device is a coil spring.

* * * * *